(12) United States Patent
Nett

(10) Patent No.: US 12,533,101 B2
(45) Date of Patent: Jan. 27, 2026

(54) METHODS AND SYSTEMS FOR ASSISTED DIAGNOSTIC SCAN ACQUISITION

(71) Applicant: GE Precision Healthcare LLC, Wauwatosa, WI (US)

(72) Inventor: Brian E. Nett, Wauwatosa, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 361 days.

(21) Appl. No.: 18/312,436

(22) Filed: May 4, 2023

(65) Prior Publication Data
US 2024/0366174 A1 Nov. 7, 2024

(51) Int. Cl.
*A61B 6/00* (2024.01)
*A61B 6/46* (2024.01)
*G06T 7/254* (2017.01)
*G06T 7/30* (2017.01)

(52) U.S. Cl.
CPC ............ *A61B 6/545* (2013.01); *A61B 6/4435* (2013.01); *A61B 6/462* (2013.01); *A61B 6/481* (2013.01); *G06T 7/254* (2017.01); *G06T 7/30* (2017.01); *G06T 2207/10081* (2013.01); *G06T 2207/20081* (2013.01); *G06T 2207/20224* (2013.01)

(58) Field of Classification Search
CPC ......... A61B 6/481; A61B 6/486; A61B 6/504; A61B 6/5264; A61B 6/5288; A61B 6/545; A61B 6/032; A61B 6/4435; A61B 6/462; G06T 2207/10081; G06T 2207/20081; G06T 2207/20224; G06T 7/254; G06T 7/30
See application file for complete search history.

(56) References Cited

U.S. PATENT DOCUMENTS

| | | | |
|---|---|---|---|
| 2010/0249582 A1 | 9/2010 | Feuerlein | |
| 2013/0012814 A1* | 1/2013 | Taguchi | A61B 6/488 600/431 |
| 2019/0192091 A1 | 6/2019 | Lee | |

FOREIGN PATENT DOCUMENTS

| | | |
|---|---|---|
| JP | 2013169392 A | 9/2013 |
| JP | 2019208752 A | 12/2019 |

OTHER PUBLICATIONS

EP application 24170390.9 filed Apr. 16, 2024—extended Search Report issued Oct. 9, 2024; 8 pages.
JP application 2024-067120 filed Apr. 18, 2024—Office Action issued Apr. 23, 2025; Machine Translation; 8 pages.
JP2013169392A English Abstract; Espacenet.com May 30, 2025; 1 page.
JP2019208752A English Abstract; Espacenet.com May 30, 2025; 1 page.
Meijer, F. et al., "Ultra-high-resolution subtraction CT angiography in the follow-up of treated intracranial aneurysms," Insights into Imaging, vol. 10, No. 2, Jan. 28, 2019, 6 pages.

* cited by examiner

*Primary Examiner* — Dani Fox
(74) *Attorney, Agent, or Firm* — McCoy Russell LLP

(57) ABSTRACT

Various methods and systems are provided for an x-ray imaging system. In one example, a method for the system includes, responsive to operation of the x-ray imaging system in an automated mode, generating a difference image from a first image and a second image. The difference image is displayed at a display device to allow motion outside of a region of interest (ROI) to be detected based on analysis of the difference image. Further, the difference image is displayed before a contrast agent reaches the ROI.

19 Claims, 12 Drawing Sheets

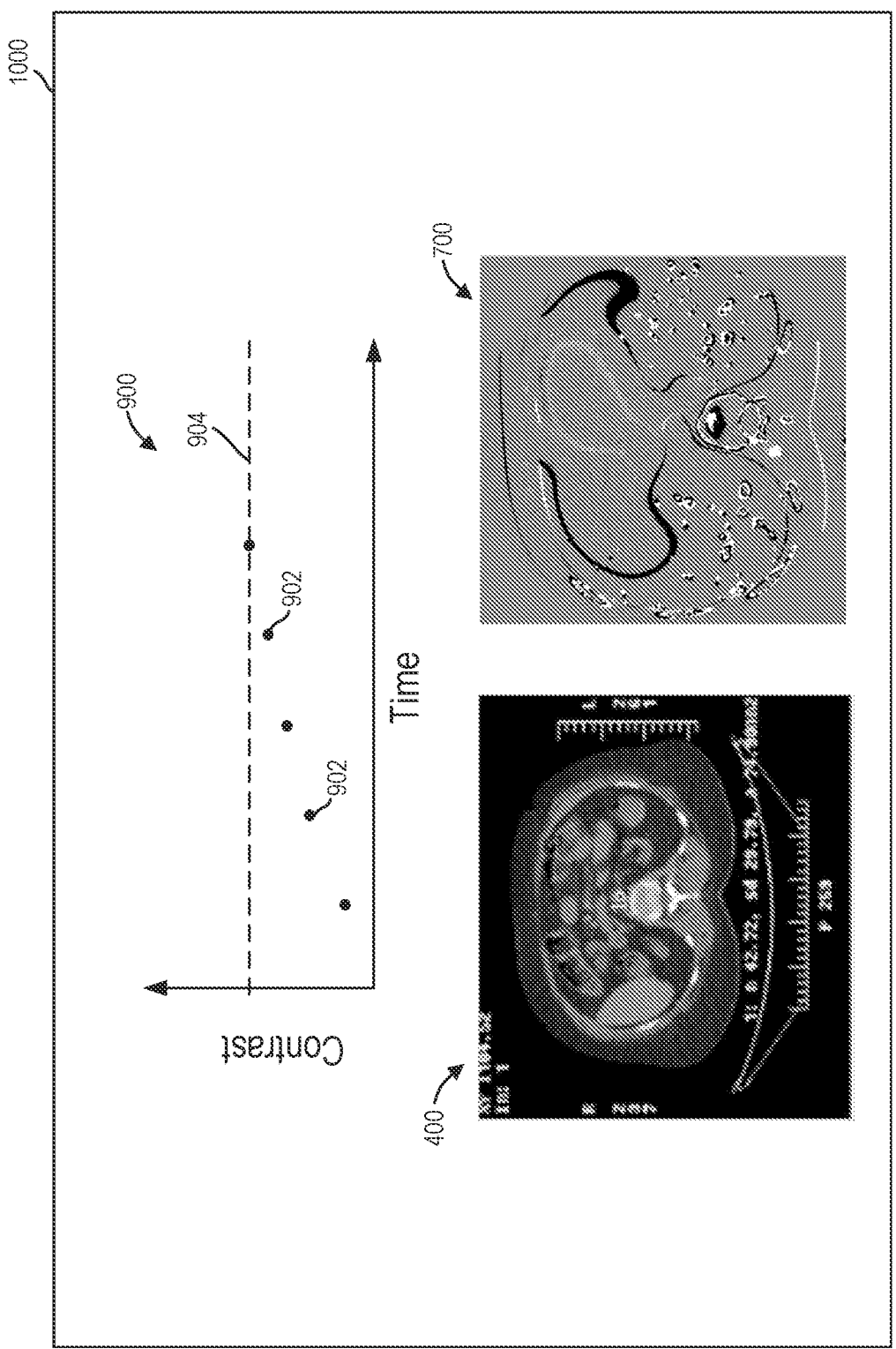

METHODS AND SYSTEMS FOR ASSISTED DIAGNOSTIC SCAN ACQUISITION

FIELD

Embodiments of the subject matter disclosed herein relate to acquisition of x-ray images, and, in particular, computed tomography images.

BACKGROUND

Computed tomography (CT) may be used as a non-invasive medical imaging technique. Specifically, CT imaging data acquisition may include passing x-ray beams through an object, such as a patient, such that the x-ray beams are attenuated, and then collecting the attenuated x-ray beams at an x-ray detector array. Imaging of a variety of tissues is enabled, including bone, soft tissue, etc., as well as high contrast detection that allows CT imaging systems to visualize contrast agents.

In examples where a contrast agent is used, a CT imaging system may be configured to automatically detect a change in image contrast within a monitored region of interest (ROI). In response to the contrast exceeding a threshold amount of change, acquisition of diagnostic scans may be automatically initiated. In some instances, motion at and/or near the ROI may trigger early or late acquisition of the diagnostic scans, relative to an instance of an actual change in the contrast reaching the threshold amount.

BRIEF DESCRIPTION

In one embodiment, an x-ray imaging system includes, responsive to operation of the x-ray imaging system in an automated mode, generating a difference image from a first image and a second image and displaying the difference image at a display device. By displaying the image at the display device, motion outside of a region of interest (ROI) may be detected based on analysis of the difference image. The difference image may be displayed before a contrast agent reaches the ROI. In this way, automated initiation of diagnostic scan acquisition may be assisted by an optional process for triggering diagnostic scan acquisition when motion is present outside of the ROI. Initiation of diagnostic scan acquisition may thereby be more robust to movement that may otherwise cause erroneous triggering of scanning. As a result, diagnostic information regarding a subject may be obtained more efficiently, with reduced exposure of the subject to x-rays.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 10 shows a display presented to an operator during assisted scan acquisition at a CT imaging system, according to an embodiment.

DETAILED DESCRIPTION

Figure 1:
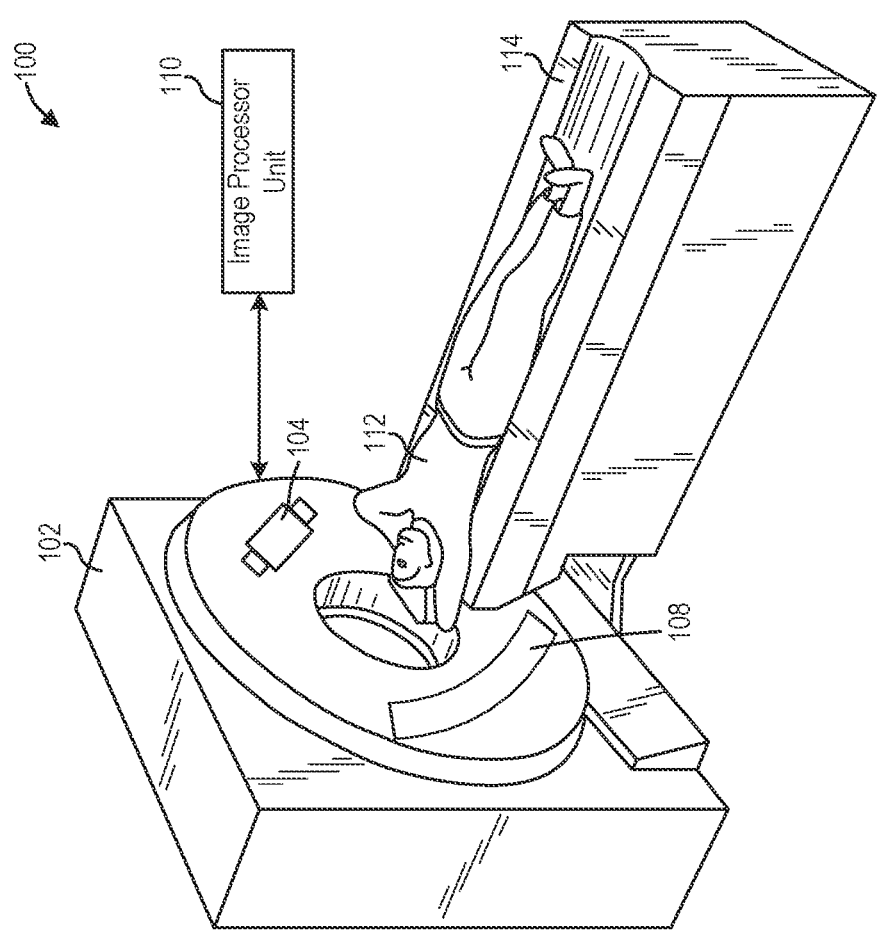
FIG. 1 shows a pictorial view of an imaging system, according to an embodiment.
Figure 2:
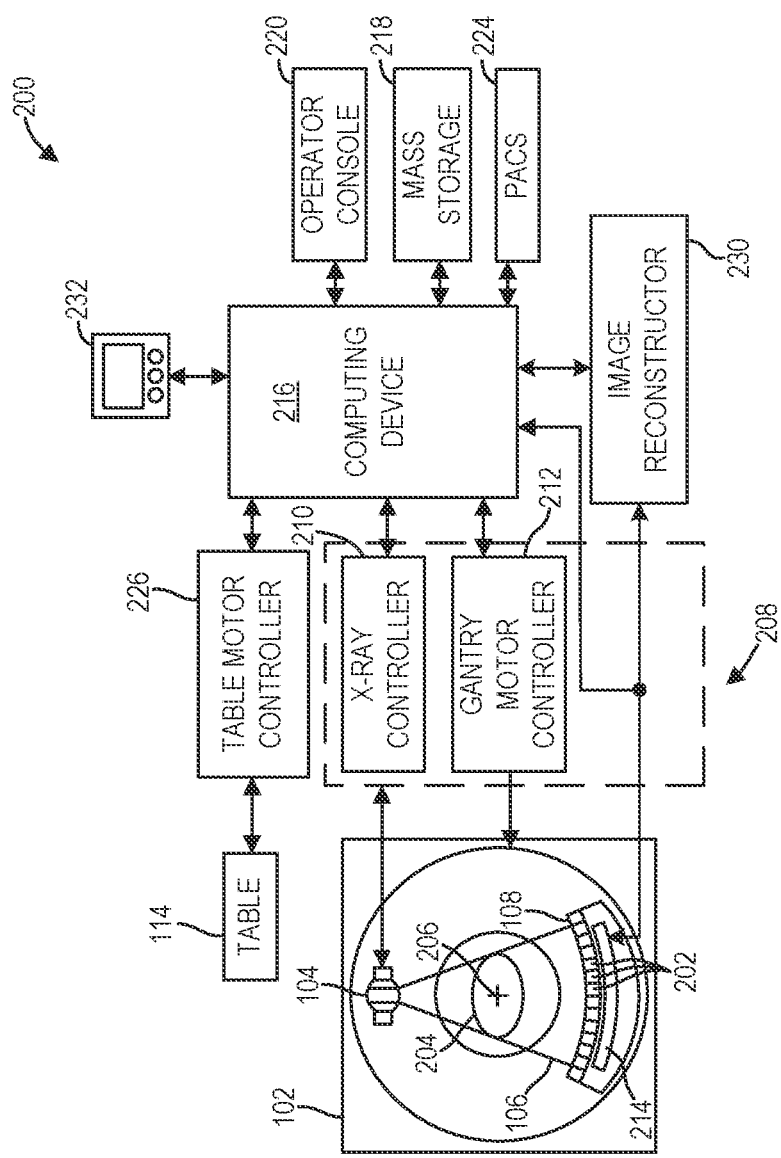
FIG. 2 shows a block schematic diagram of an exemplary imaging system, according to an embodiment.
Figure 3:
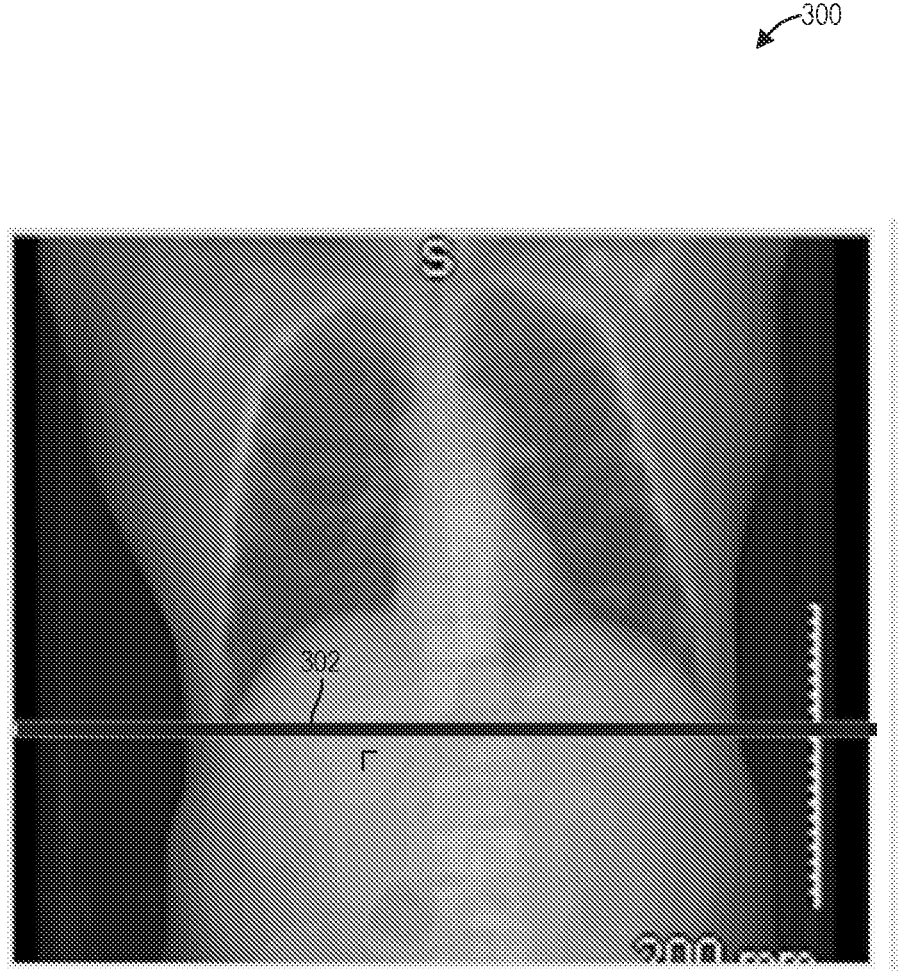
FIG. 3 shows a scout image acquired by a CT imaging system, according to an embodiment.
Figure 4:
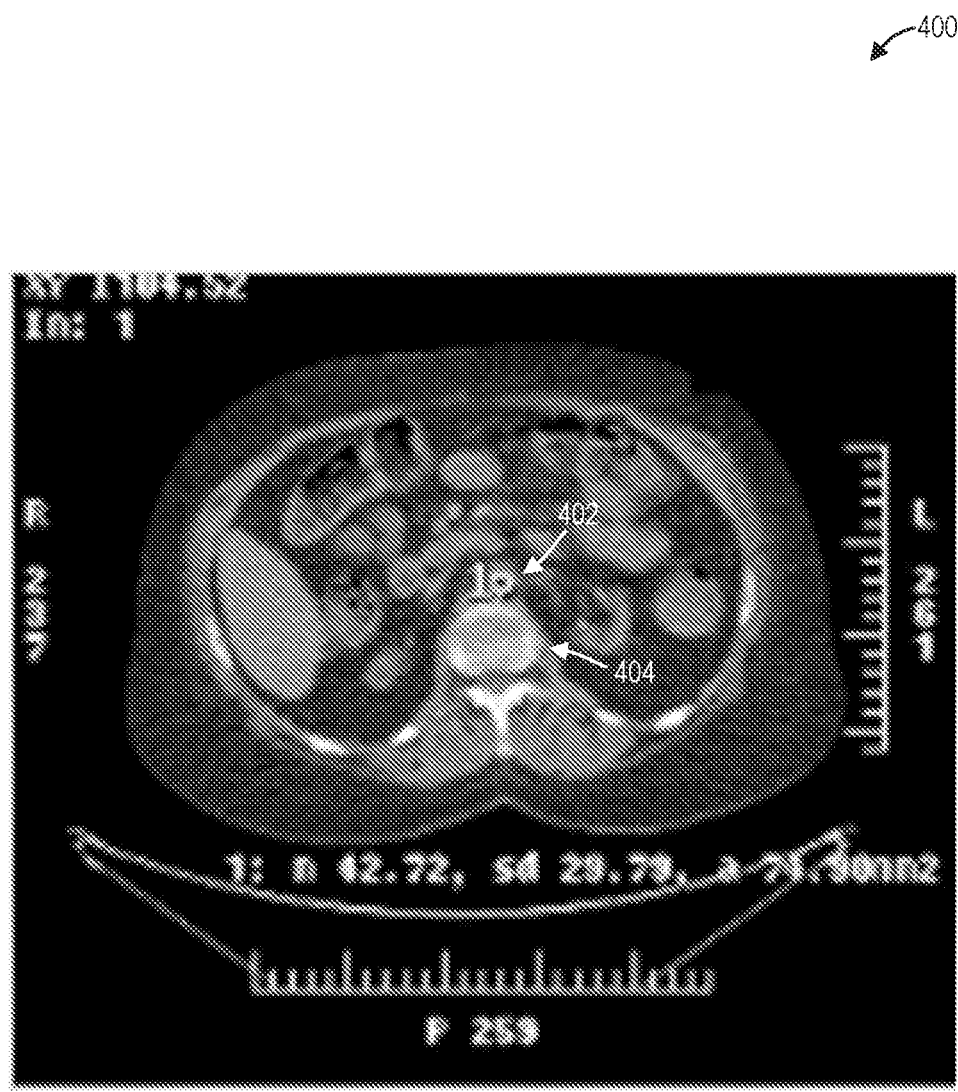
FIG. 4 shows a first cross-sectional image acquired by the CT imaging system based on the scout image of FIG. 2, according to an embodiment.
Figure 5:
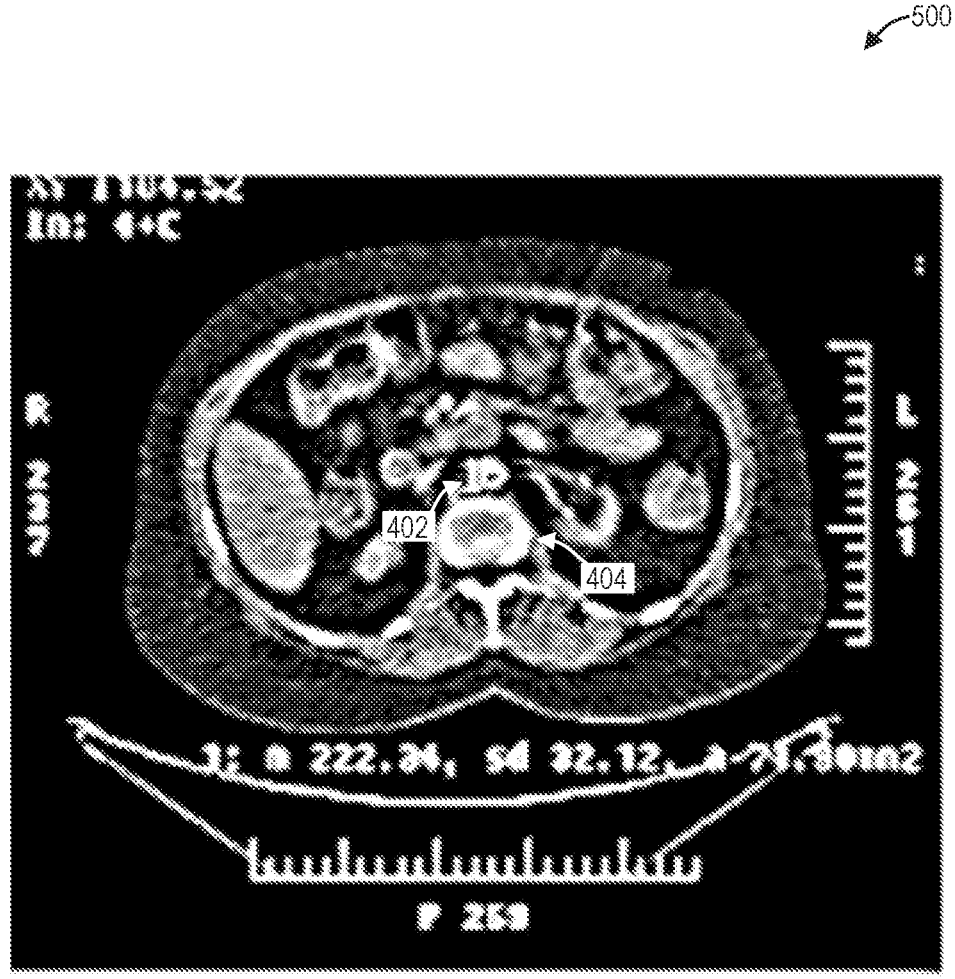
FIG. 5 shows a second cross-sectional image acquired by the CT imaging system based on the scout image of FIG. 2, according to an embodiment.
Figure 6:
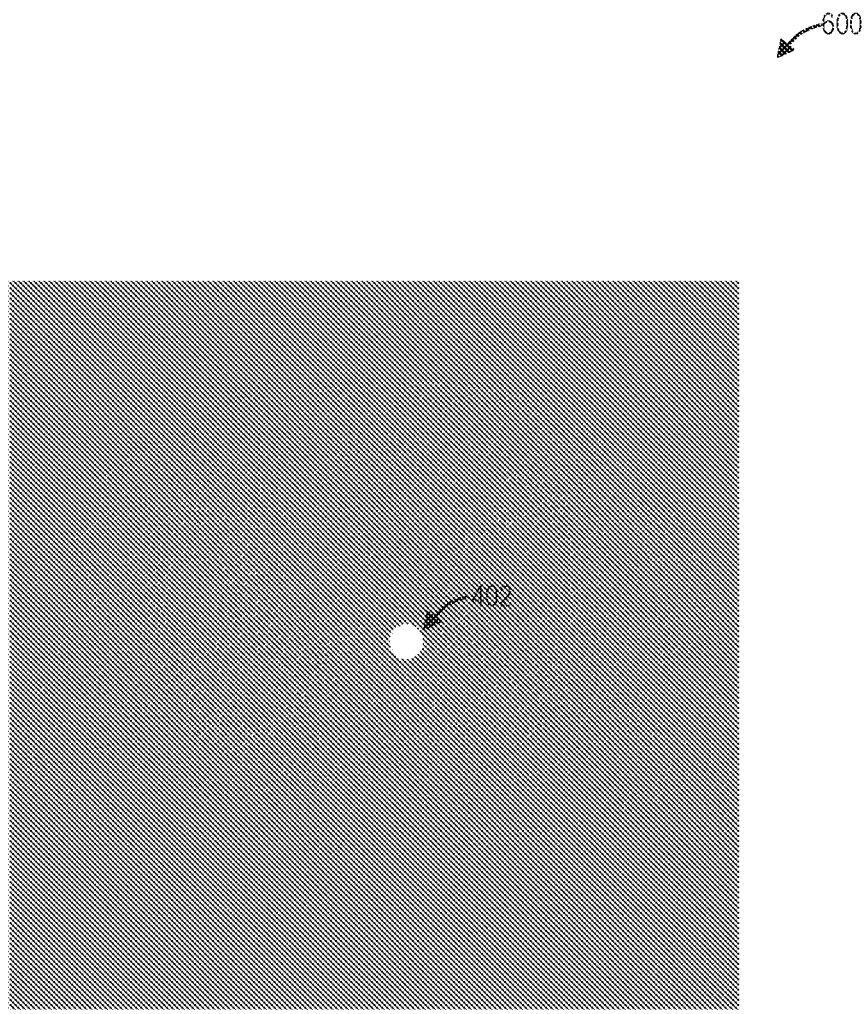
FIG. 6 shows a first difference image, according to an embodiment.
Figure 7:
FIG. 7 shows a second difference image, according to an embodiment.
Figure 11A:
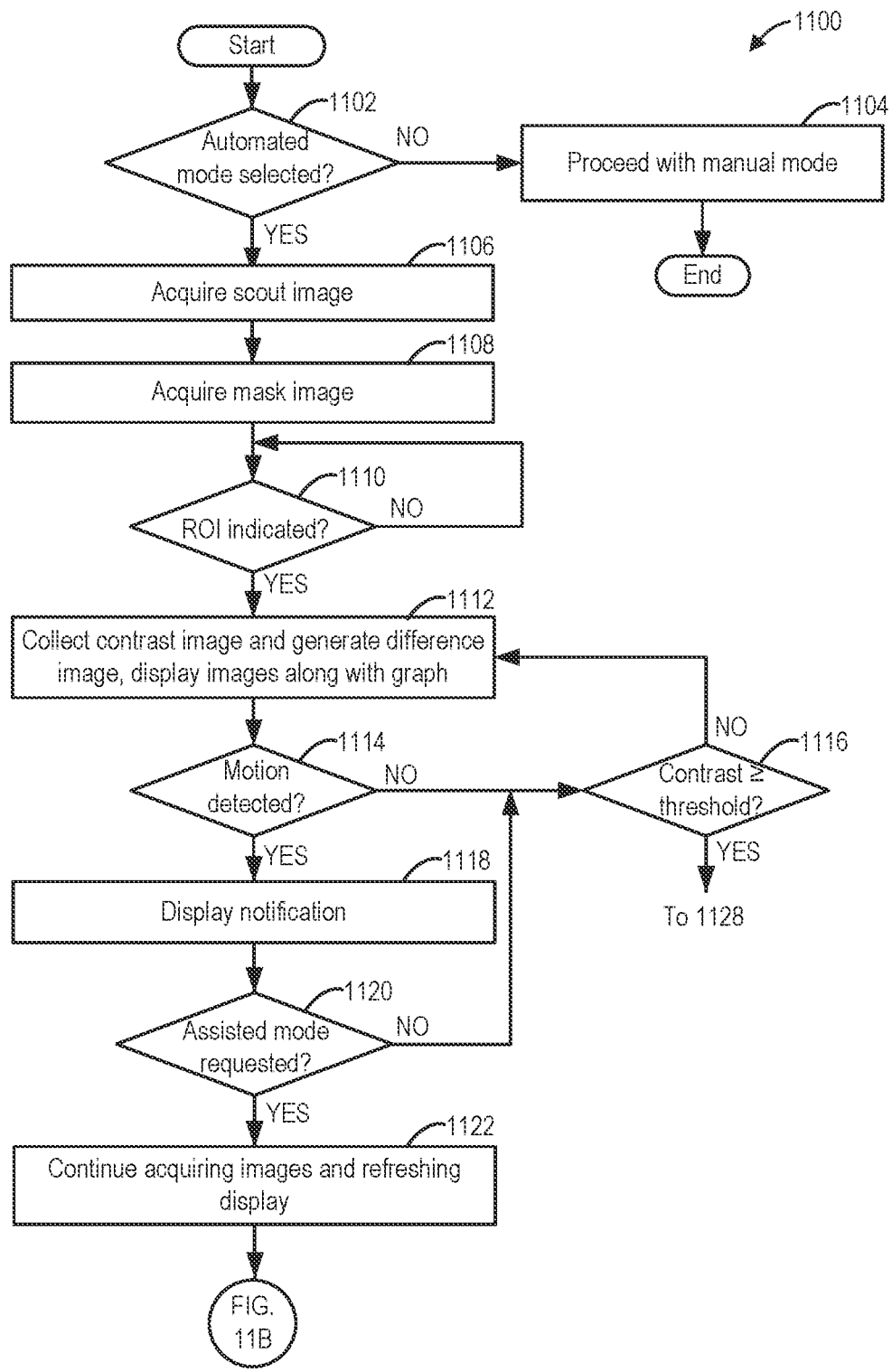
FIGS. 11A-11B show a method for acquiring CT images using a CT imaging system configured with assisted scan acquisition, according to an embodiment.
Figure 11B:
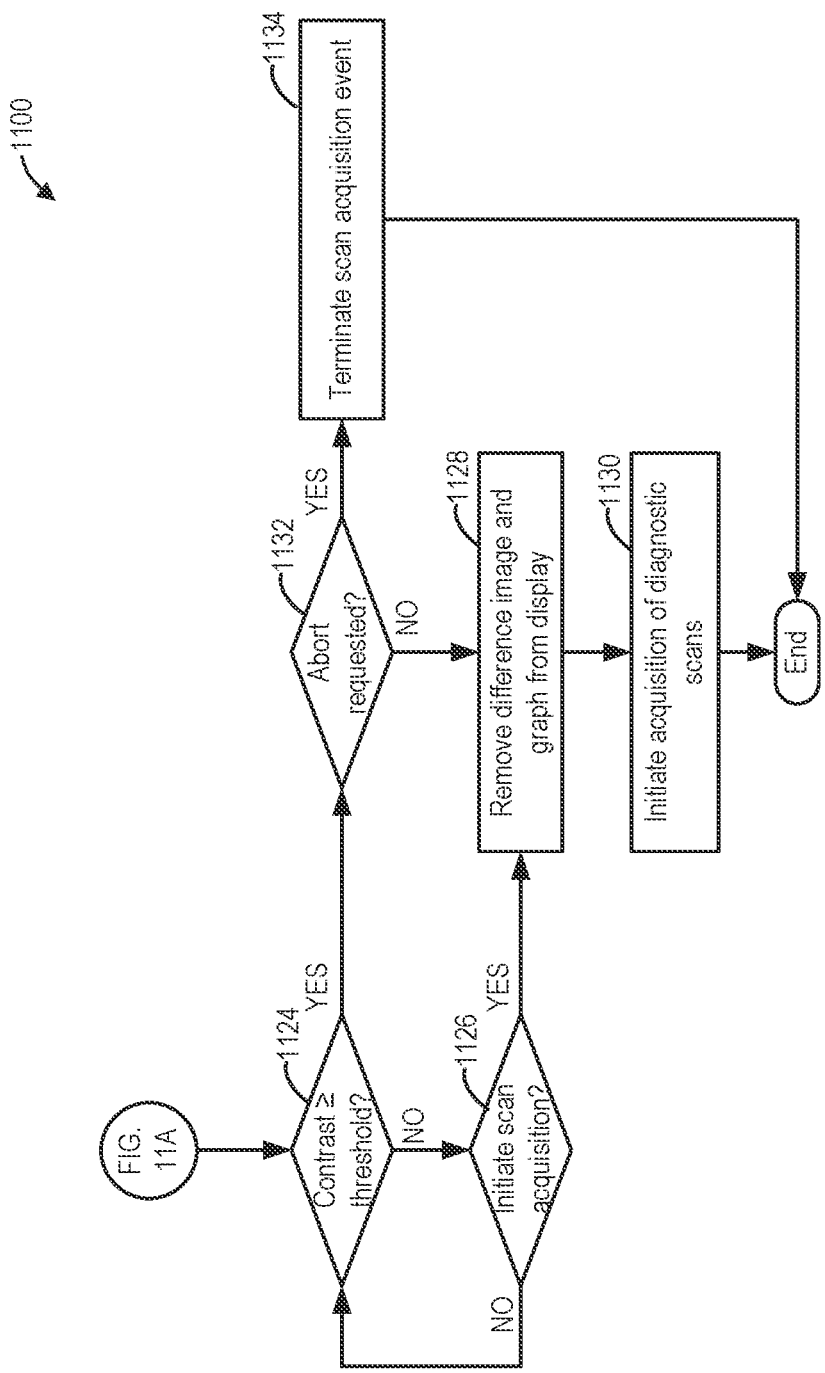

The following description relates to various embodiments of assisted diagnostic scan acquisition in x-ray imaging systems. More specifically, diagnostic scan acquisition may be automatically triggered and modified in a CT system based on detection of motion at a region of interest (ROI). An example of a CT system is illustrated in FIG. 1 and a block schematic diagram of components of a CT system is depicted in FIG. 2. During a diagnostic event, a scout image, as shown in FIG. 3, may be initially acquired in order to orient the CT system. The scout image may then be used as a guide for obtaining cross-sectional images, examples of which are depicted in FIGS. 4-5, which may be focused on a region of interest (ROI). In order to determine a mode of scan acquisition initiation to be implemented at the CT system, a difference image may be generated to determine if motion is around the ROI. Examples of the difference image are shown in FIGS. 6-7. The difference image may be used to select the mode of scan acquisition initiation according to a high level workflow illustrated in FIG. 8, in which assisted scan acquisition may be implemented when motion is detected. During initial stages of scan acquisition, a difference in contrast in the cross-sectional images acquired by the CT system may be monitored, as depicted in a graph in FIG. 9, which may be displayed to an operator along with CT images, as shown in FIG. 10. An example of a method for acquiring CT images via assisted scan acquisition is shown in FIGS. 11A-11B.

Before further discussion of the approach for assisted scan acquisition, a general overview of CT imaging is provided. FIG. 1 illustrates an exemplary CT system 100 configured for CT imaging. Particularly, the CT system 100 is configured to image a subject 112 such as a patient, an inanimate object, one or more manufactured parts, and/or foreign objects such as dental implants, stents, and/or contrast agents present within the body. In one embodiment, the CT system 100 includes a gantry 102, which in turn, may further include at least one x-ray source 104 configured to project a beam of x-ray radiation 106 (see FIG. 2) for use in imaging the subject 112 laying on a table 114. Specifically, the x-ray source 104 is configured to project the x-ray radiation beams 106 towards a detector array 108 positioned on the opposite side of the gantry 102. Although FIG. 1 depicts only a single x-ray source 104, in certain embodiments, multiple x-ray sources and detectors may be employed to project a plurality of x-ray radiation beams 106 for acquiring projection data at different energy levels corresponding to the patient. In some embodiments, the x-ray source 104 may enable dual-energy gemstone spectral imaging (GSI) by rapid peak kilovoltage (kVp) switching. In some embodiments, the x-ray detector employed is a photon-counting detector which is capable of differentiating x-ray photons of different energies. In other embodiments, two sets of x-ray sources and detectors are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processor unit 110 may use both an analytic image reconstruction approach such as FBP in addition to an iterative image reconstruction approach.

In some CT imaging system configurations, an x-ray source projects a cone-shaped x-ray radiation beam which is collimated to lie within an X-Y-Z plane of a Cartesian coordinate system and generally referred to as an "imaging plane." The x-ray radiation beam passes through an object being imaged, such as the patient or subject. The x-ray radiation beam, after being attenuated by the object, impinges upon an array of detector elements. The intensity of the attenuated x-ray radiation beam received at the detector array is dependent upon the attenuation of a radiation beam by the object. Each detector element of the array produces a separate electrical signal that is a measurement of the x-ray beam attenuation at the detector location. The attenuation measurements from all the detector elements are acquired separately to produce a transmission profile.

In some CT systems, the x-ray source and the detector array are rotated with a gantry within the imaging plane and around the object to be imaged such that an angle at which the radiation beam intersects the object constantly changes. A group of x-ray radiation attenuation measurements, e.g., projection data, from the detector array at one gantry angle is referred to as a "view." A "scan" of the object includes a set of views made at different gantry angles, or view angles, during one revolution of the x-ray source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, positron emission tomography (PET), or single-photon emission CT (SPECT) acquisition, and/or any other modality including modalities yet to be developed as well as combinations thereof in fused embodiments.

The projection data is processed to reconstruct an image that corresponds to a two-dimensional slice taken through the object or, in some examples where the projection data includes multiple views or scans, a three-dimensional rendering of the object. One method for reconstructing an image from a set of projection data is referred to in the art as the filtered back projection technique. Transmission and emission tomography reconstruction techniques also include statistical iterative methods such as maximum likelihood expectation maximization (MLEM) and ordered-subsets expectation-reconstruction techniques as well as iterative reconstruction techniques. This process converts the attenuation measurements from a scan into integers called "CT numbers" or "Hounsfield units," which are used to control the brightness of a corresponding pixel on a display device.

To reduce the total scan time, a "helical" scan may be performed. To perform a "helical" scan, the patient is moved while the data for the prescribed number of slices is acquired. Such a system generates a single helix from a cone beam helical scan. The helix mapped out by the cone beam yields projection data from which images in each prescribed slice may be reconstructed.

As used herein, the phrase "reconstructing an image" is not intended to exclude embodiments of the present invention in which data representing an image is generated but a viewable image is not. Therefore, as used herein, the term "image" broadly refers to both viewable images and data representing a viewable image. However, many embodiments generate (or are configured to generate) at least one viewable image.

FIG. 2 illustrates an exemplary imaging system 200 similar to the CT system 100 of FIG. 1. In accordance with aspects of the present disclosure, the imaging system 200 is configured for imaging a subject 204 (e.g., the subject 112 of FIG. 1). In one embodiment, the imaging system 200 includes the detector array 108 (see FIG. 1). The detector array 108 further includes a plurality of detector elements 202 that together sense the x-ray radiation beam 106 (see FIG. 2) that pass through the subject 204 (such as a patient) to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 204. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density maps or images of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. In one example, the computing device 216 stores the data in a storage device or mass storage 218. The storage device 218, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

In some examples, as described herein, the computing device 216 may be configured with instructions, e.g., algorithms, to initiate acquisition of diagnostic scans in response to a trigger according to an automatic scan acquisition mode. The trigger may, in one example, be a change in image contrast by at least a threshold amount, corresponding to detection of a contrast agent in an ROI. The instructions may also allow motion near the ROI (e.g., at regions surrounding the ROI) to be detected, which may prompt an option for initiating acquisition according an assisted scan acquisition mode to be presented to the operator. Further details of the automatic and assisted scan acquisitions modes are provided further below, with reference to FIGS. 3-11.

Although FIG. 2 illustrates only one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

The various methods and processes (such as a method described below with reference to FIGS. 11A-11B described further herein may be stored as executable instructions in non-transitory memory on a computing device (or controller) in imaging system 200. In one embodiment, the computing device 216 may include such executable instructions to automatically generate a difference image based on two sequentially acquired images during initial stages of scan acquisition. The difference image may be used to determine if motion is occurring near but outside of an ROI, and the determination may be used, according to the executable instructions, to adjust initiation of scan acquisition between an automated and an assisted mode.

By enabling operation of the CT system in either the automated or assisted mode during diagnostic scan initiation, a start of scan acquisition may correspond more closely to appearance of a contrast agent in the ROI, thereby increasing a quality of a reconstructed image output by the CT system. In the automated mode, scan acquisition may be initiated without operator input while in the assisted mode, scan acquisition may be initiated with input from an operator or a machine learning model. For example, during CT imaging of a subject, the subject may move while the CT system is operating. In some instances, such as when contrast agents are used to enhance resolution, the CT system may be configured to automatically initiate scan acquisition when an increase in contrast (e.g., image contrast) in an acquired image of the ROI, relative to a previously acquired image, is detected to reach a threshold. When movement in the subject occurs, however, distortion of the acquired images may erroneously trigger diagnostic scan acquisition. In some examples, inaccurate detection of the increase in contrast may also occur as a result of image noise.

A resulting reconstructed image may be of poor quality, e.g., resolution and clarity, due to the inaccurate triggering of scan acquisition, which may demand further scanning of the subject. Furthermore, a tendency of the automated mode of scan acquisition initiation to be triggered by events other than the increase in contrast reaching the threshold may discourage the operator from using the automated mode of scan acquisition initiation. As a result, the operator may rely entirely on manual triggering of scan acquisition, which may decrease a workflow efficiency and increase a burden on the operator.

In one example, as described herein, the issues described above may be at least partially addressed by adapting the CT system with an assisted mode for scan acquisition initiation that may operate in conjunction with the automated mode. The assisted mode may include instructions to generate at least one difference image during initial frame collection and assessment, such as after a scout image is obtained and before the contrast agent is anticipated to reach an ROI. The difference image may be generated from an actual, current image and an initial mask image, and may be displayed to the operator, e.g., at a display screen of an operator console such as the display device 232 of FIG. 2. The operator may thereby be able to override operation in the automatic mode to instead select operation in the assisted mode of scan acquisition based on observations of the difference image. An actual image of the ROI, e.g., a cross-sectional image acquired by the CT system, may also be projected at the display screen, which may additionally or alternatively allow the operator to monitor the actual image for motion.

In another example, an automated process may be used to assess the difference image for motion that may cause distortions that may otherwise lead to erroneous triggering of scan acquisition. Upon determining that motion is present, the operator may be notified and presented with an option to switch to the assisted mode of scan acquisition, where the operator may manually trigger scan acquisition. Concurrent with processing of the difference image by the image processing algorithms, the operator may also observe the difference image at the display screen and manually select operation in the assisted mode based upon visual inspection of the difference image.

For example, machine learning algorithms may be used to analyze the difference image to identify motion. When motion is detected, the machine learning algorithms may include instructions to delay scan acquisition initiation until the motion is no longer detected. As such, scan acquisition may be initiated via an automated, mode that is assisted by machine learning.

In addition, machine learning algorithms may be used to adjust a position of the ROI from frame to frame during frame collection prior to scan acquisition initiation. For example, a trained machine learning model may be configured to identify an ROI in an image, track a position of the ROI based on the difference image, and output an updated image with the ROI in real-time, where real-time refers to generation of new data that is current, based on a most recent set of acquired data. As an example, the machine learning model may be trained based on acquired data, as well as data that has been manipulated, e.g., moved in a known manner, to simulate movement of the ROI. For example, supervised training may be achieved using a reference image without motion along with multiple simulations of the object moving. The machine learning model may output an indicator of whether patient motion was detected between reconstructed time frames.

Alternatively, re-positioning of the ROI may be executed using a fast image alignment algorithm motion. For example, an initial image, e.g., the mask image, may be used as a template for aligning a subsequently acquired image. Image registration algorithms such as rigid registration and deformable registration approaches may be used to achieve image alignment, or a registration model may be trained in a similar manner as described above for the machine learning model. As the displayed actual image is refreshed, the ROI may be re-positioned in the actual image.

As another option for tracking the position of the ROI, an entire image, such as the mask image, may be registered prior to placement of the ROI. The subsequent acquired images may be registered relative to landmarks, which may be readily identifiable features proximate to the ROI. Image registration may allow a position of the ROI to be updated with respect to motion in the subject. Such automated ROI alignment may provide accurate measurement of a CT number despite motion of the patient. The automated alignment may be accomplished using a model trained as described above with respect to the machine learning model but an output of the model may instead be coordinates for translating the ROI rather than a binary value indicating whether motion occurred. Alternatively, in examples where fast image alignment is utilized, ROI translation is not demanded whereas the ROI translation is required when fast image alignment is applied. In either instance, the user may observe an image and the ROI may be positioned robustly over an anatomy of interest, such as the aorta. However, image registration may be a relatively slow process and may not be applicable if the motion moves the ROI out of an imaging plane.

Details of assisted scan acquisition initiation are provided in the following descriptions of FIGS. 3-11. Turning first to FIG. 3, an example of a scout image 300 is shown. The scout image 300 may be acquired by a CT system at a start of an imaging event and used to indicate a target region to be imaged. For example, the scout image 300 may be a digital radiograph, e.g., a two-dimensional x-ray image, that includes an anatomical region of a subject, from which cross-sectional images are to be obtained. A scan range of subsequent CT scan acquisition may be defined by the scout image 300.

A marker may be placed on the scout image 300 to indicate a desired scan plane for CT scan acquisition. For example, the operator may add a line 302 directly to the scout image 300 which may then be used to position a gantry of the CT system, e.g., the gantry 102 of FIGS. 1 and 2, to target the indicated scan plane. Cross-sectional images may then be collected according to the line 302. An example of a first cross-sectional image 400 corresponding to the line 302 of the scout image 300 is depicted in FIG. 4.

The first cross-sectional image 400 is a frame showing a slice of the subject's anatomy and may be acquired while the gantry of the CT system remains stationary. A marker indicating an ROI 402 may be placed on the first cross-sectional image 400, e.g., by the operator, to indicate a specific location for which data collection is desired. The ROI 402 may be, as an example, an aorta which may be adjacent to a landmark 404, which may be another anatomical feature, such as bone, for example.

When automated scan acquisition initiation is implemented, the ROI 402 may be monitored for a change in a visual parameter. For example, a contrast agent may be introduced to the subject, e.g., injected or ingested, and frames collected subsequent to the first cross-sectional image 400 (also with the gantry remaining stationary) may be monitored for a change in contrast at the ROI as the contrast agent is circulated through the subject.

As an example, a second cross-sectional image 500 is depicted in FIG. 5 which captures a same field of view (FOV) as the first cross-sectional image 400, including the ROI 402 and the landmark 404. The second cross-sectional image 500 may be a frame collected immediately after the first cross-sectional image 400 is acquired, according to a predetermined image acquisition frequency. Alternatively, the second cross-sectional image 500 may be a frame acquired after the first cross-sectional image 400 but not immediately after (e.g., additional frames were collected in between).

In the second cross-sectional image 500, a contrast at the ROI 402 may be increased due to infiltration of the contrast agent. The change in contrast may affect x-ray attenuation, allowing the change in contrast to be observed in scans when the contrast agent reaches the ROI 402. The scans may be processed using image processing algorithms and when the change in contrast at the ROI 402 in a frame reaches the pre-set threshold, acquisition of diagnostic scans may be automatically initiated.

The automated mode of scan acquisition initiation, however, may not be robust to movement that may cause contrast at the ROI to appear to change, resulting in erroneous triggering of scan acquisition. For example, if the subject moves during the initial period of image collection to monitor the change in contrast between images, adjacent anatomical features may shift into the marked ROI. As an example, the landmark 404 may shift into the area marked as the ROI 402 by the operator when the subject moves. A difference in contrast of bone versus the aorta may be sufficient to cause the change in contrast to reach the threshold and activate acquisition of diagnostic scans.

Movement around and outside of the ROI may be detected from a difference image generated from the acquired cross-sectional images. The difference image may be an image resulting from subtraction of one image frame from another, where the frames are collected at different time points. When no motion occurs outside of the ROI 402, a first difference image 600 depicted in FIG. 6 may be generated.

In one example, the first difference image 600 may be produced by subtracting a first cross-sectional image acquired before the contrast agent is delivered to the subject from a second cross-sectional image acquired after the contrast agent is delivered to the subject. The first cross-sectional image may be referred to as a mask image and the second cross-sectional image may be referred to as a contrast image. The mask image may be subtracted from the contrast image on a pixel-by-pixel basis to generate the first difference image 600, which may be displayed to the operator in real-time. The ROI 402 in the first difference image 600 is a distinct circular spot that demonstrates high contrast relative to regions surrounding the ROI 402. It will be appreciated, however, that variations in an appearance of the ROI in the difference image may vary according to a type of anatomical feature targeted in the ROI.

When motion does occur at and/or around the ROI 402, however, a difference image such as a second difference image 700 shown in FIG. 7 may be produced instead. The second difference image 700 may be generated as described above, e.g., by subtracting the first cross-sectional image (e.g., mask image) from the second, later acquired cross-sectional image (e.g., contrast image). In the second difference image 700, the ROI 402 is also displayed as a bright, circular spot with high contrast relative to surrounding regions. Additional structures are also visible in the difference image 700, which may manifest as distortions 702. The distortions 702 may result from misalignment of the anatomical features captured in the first and second cross-sectional images, where the misalignment is a result of the movement at and/or around the ROI 402.

In one example, when the second difference image 700 is displayed to the operator, the operator may observe the distortions 702 and choose to override automated scan acquisition initiation at the CT system to mitigate erroneous triggering of diagnostic scan acquisition. As another example, a difference image generated in real-time during an initial monitoring period of a CT scan acquisition event may be processed using image processing algorithms (e.g., software) to detect movement by identifying distortions, such as the distortions 702 of FIG. 7. Upon identifying the distortions from the difference image, the image processing algorithms may include instructions to display a notification to the operator that movement is detected. The operator may then decide how to proceed, e.g., by continuing with automated scan acquisition initiation, or switching to manual, operator-activated initiation.

Additionally or alternatively, machine learning algorithms of a machine learning model may be trained to detect movement in the ROI based on the difference image. For example, the machine learning algorithms may be trained to analyze the difference image for a presence of the distortions using various techniques such as feature mapping, image registration, image classification. Furthermore, the machine learning algorithms may be trained by simulating patient motion through re-sampling the volume in between subsequent time frames. Upon detection of the distortions, the machine learning algorithms may, in one example, be configured to notify the operator of the detected motion, as described above with reference to processing via the image processing algorithms. The operator may thereby decide whether to proceed with automated or assisted (e.g., manual) scan acquisition initiation.

As another example, the trained machine learning model may be integrated into the automated mode of scan acquisition initiation. For example, the difference image may be automatically monitored and analyzed by the machine learning model to detect motion in the ROI based on identification of the distortions. Upon detecting motion in the ROI, the trained machine learning model may override the automated mode of scan acquisition initiation (e.g., default settings of the automated mode used when no motion is detected).

The machine learning model may further be configured to generate a vector map based on the difference image, which may be used to guide re-positioning of the ROI to reflect an actual position of the target anatomical feature to be scanned. The contrast image and/or the difference image may be updated with the re-positioned ROI for each newly acquired image frame and monitored for contrast. When the contrast reaches a threshold amount, scan acquisition may be initiated.

Although the machine learning model may be implemented in a machine learning-assisted automatic mode, an option may be provided for an operator to override the machine learning-assisted automatic mode and switch to manually-initiated scan acquisition. When the operator chooses to manually initiate scan acquisition, the machine learning model may continue to re-position and update the ROI in the contrast image and/or the difference image.

Alternatively, the ROI may be re-positioned based on a fast image alignment algorithm or image registration, as described above. When the fast image alignment algorithm is used, the contrast image and/or difference image may be displayed with the re-positioned ROI when the images are refreshed. In the case of image registration, a contrast cross-sectional image acquired in real-time may be registered to a mask cross-sectional image obtained at the start of the scan acquisition event. When motion is detected near or around the ROI, e.g., by the operator or by the machine learning model, the motion may be used to re-position the ROI.

For example, as described above, the images may be registered based on landmarks identified in the mask and contrast images. For example, a location of the ROI 402 relative to the landmark 404 of FIGS. 4 and 5, representing bone, in the mask image may be determined. The landmark 404 may be more opaque and its contrast may be independent of the contrast agent. A change in location of the landmark may be mapped and used to re-position the ROI according to the relative location of ROI with respect to the landmark.

Image registration may provide an established method for re-aligning images that is widely used for two-dimensional image alignment. For the CT system, however, movement of the ROI may occur within an imaging plane, or may be shifted out of the imaging plane according to how the subject moves. As such, image registration may be reliable for motion compensation within the imaging plane but may not be able to track motion in directions other than along the imaging plane. Similarly, the fast image alignment algorithm may only be an efficient technique for alignment of two-dimensional images. Furthermore, image registration may be an iterative, computing-intensive process that may demand longer time periods for completion than a frequency of frame capture. As such, re-positioning of the ROI using the machine learning model may be more efficient and more robust.

Figure 8:
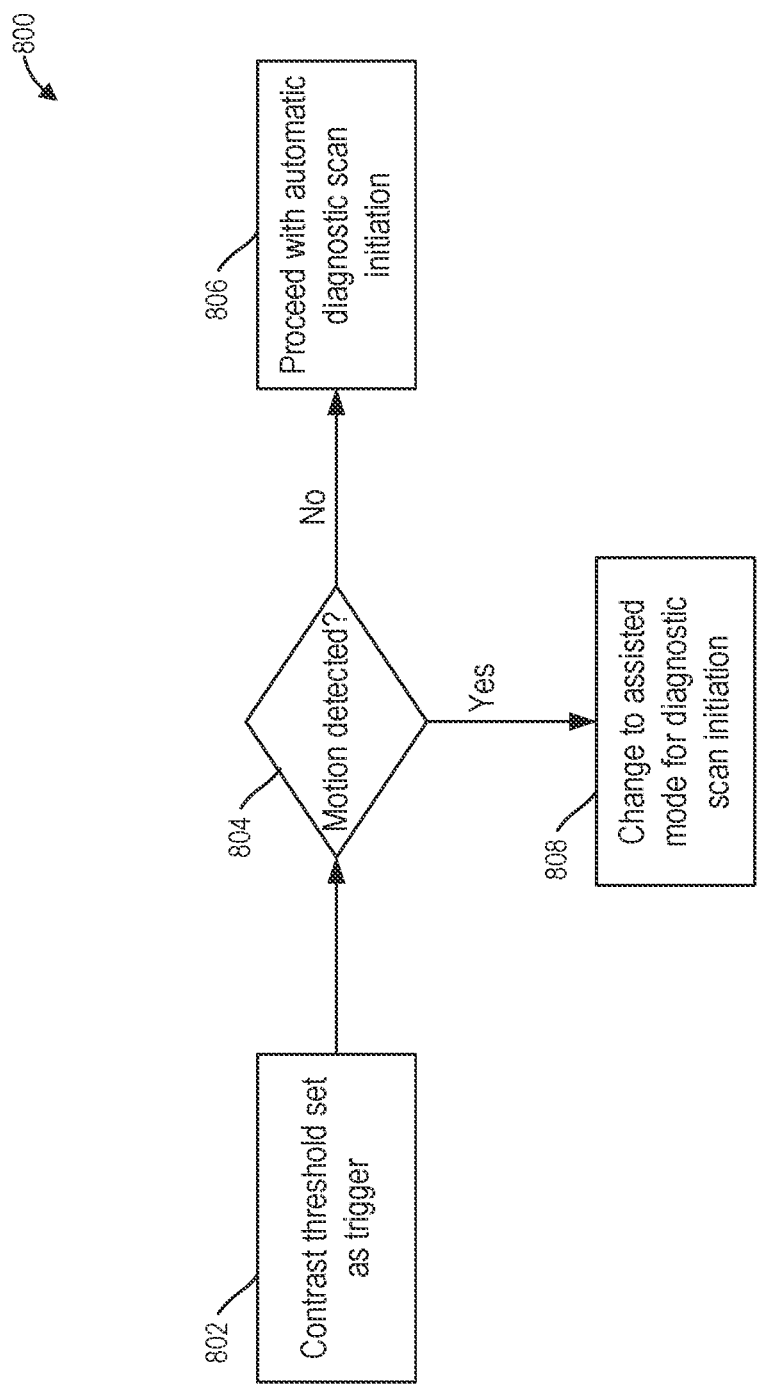
FIG. 8 shows a high level work flow for assisted scan acquisition at a CT imaging system, according to an embodiment.

A high-level workflow 800 for a CT system configured with automated and assisted modes of scan acquisition initiation is illustrated in FIG. 8. As an example, the CT system may be the imaging system 200 of FIG. 2. At 802 of the workflow 800, a threshold increase in contrast is set as a trigger for initiating scan acquisition, which may depend on a kVp of the acquisition and a contrast injection protocol used. The threshold may be set before a scout image is acquired or after the scout image is acquired but before acquisition of cross-sectional images begins (e.g., cross-sectional images used to trigger diagnostic scan acquisition). After the threshold is set, the acquisition of the cross-sectional images may begin, which may include collecting a mask image followed by contrast images. An operator may designate an ROI at the mask image which is propagated to the subsequently captured contrast images.

A difference image may be generated from the mask image and a contrast at the ROI may be determined from the difference image. The difference image may be refreshed at a rate corresponding to a frequency of image acquisition of the contrast images. At 804 of the workflow 800, the difference image may be used to detect motion outside of the ROI and within the frame of the difference image, according to any of the strategies described above. If motion is not detected, the workflow 800 continues to 806 to initiate diagnostic scan acquisition via an automated mode that does not rely on operator input. For example, when the contrast in the difference image is determined to reach the threshold, scan acquisition may be triggered.

If motion is detected at 804, however, the workflow 800 instead proceeds to 808 to switch to an assisted mode for diagnostic scan acquisition initiation. In some examples, rather than automatically switching to the assisted mode in response to detection of motion, a prompt requesting input from the operator may be displayed, providing an alert that motion is detected and presenting an option to switch to the assisted mode. The assisted mode may rely on the operator to initiate scan acquisition or a machine learning model. In one example, when assisted by the operator, an option to re-position the ROI may be provided, either by a fast image alignment or by the machine learning model to allow the operator to better discern when to trigger scan acquisition. When assisted by the machine learning model, the ROI may be re-positioned and monitored for change in contrast.

Figure 9:
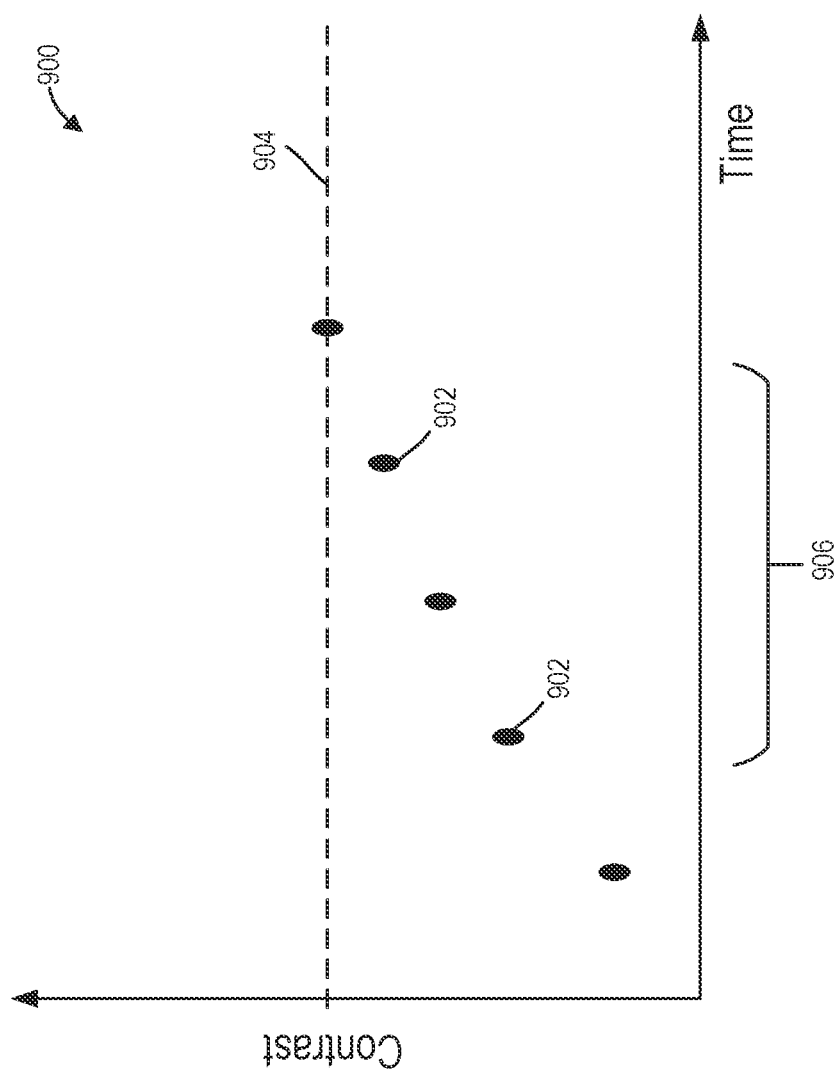
FIG. 9 shows a graph plotting contrast at a region of interest in a difference image, according to an embodiment.

Algorithms providing instructions for executing assisted and automated scan acquisition initiation at the CT system may include commands for outputting and displaying information to the operator at, for example, the display screen. The displayed information may include, as shown in FIG. 9, a real-time graph 900 plotting a contrast at an ROI of a difference image over time, where the contrast at the difference image is representative of a change in contrast between the images used to generated the difference image. Each of a plurality of data points 902 may be generated when the difference image is refreshed based on acquisition on a new contrast image, where the difference image accounts for motion such that the ROI is re-positioned in between image frames. The contrast images may be collected according to a pre-set frequency and the real-time graph 900 may be updated with a new data point at a rate corresponding to the pre-set frequency.

The real-time graph 900 may include a threshold contrast 904, as indicated by a dashed line. The threshold contrast 904 may be an increase in contrast indicative of a contrast agent reaching the ROI. The real-time graph 900 may be displayed at least during an initial stage of a CT imaging event, such as before diagnostic scan acquisition is triggered.

Display of the real-time graph 900 may also provide the operator with a visual count down of a period of time during which overriding of automated scan acquisition initiation is allowable. For example, during a time period indicated by bracket 906, the operator may be presented with an option to switch to the assisted mode of scan acquisition initiation if motion is detected (either by the operator or by a machine learning model). The time period may extend from after a first cross-sectional image is acquired, which may be used as a mask image, and before the contrast reaches the threshold contrast 904. If the switch to the assisted mode is not indicated before the timer period expires, diagnostic scan acquisition may proceed once the contrast reaches the threshold contrast 904.

If the operator chooses to switch to the assisted mode within the time period indicated by bracket 906, display of the real-time graph 900 is maintained and display of images, as described below with reference to FIG. 10, may be continually refreshed as new images are collected and generated. After the time period indicated by bracket 906, however, the option to switch to the assisted mode may no longer be available and the graph 900 may be removed from display.

As shown in FIG. 10 in an example of a display screen 1000, the real-time graph 900 may be displayed along with a cross-sectional image, which may be the first cross-sectional image 400 of FIG. 4 but may, in other examples, be the second cross-sectional image 500 of FIG. 5 or any mask or contrast image captured most recently during an initial stage of a CT imaging event.

The display screen 1000 may also show a difference image, which may be the second difference image 700 of FIG. 7, as an example. The displayed difference image may be a most recently generated difference image and may be updated as new contrast images are obtained. The cross-sectional image and the difference image may be presented during the initial stage of the CT imaging event, allowing the operator to observe changes in contrast and clarity at the cross-sectional image and presence of distortions at the difference image.

For example, the cross-sectional image 400 may be displayed and refreshed as each new cross-sectional image is acquired. Each refreshing of the cross-sectional image may correspond to one of the data points 902 of the real-time graph 900, which are added as the cross-sectional images are acquired. The difference image may be displayed after a first cross-sectional image is obtained, which may be a mask image, as indicated by the bracket 906 of FIG. 9. In some examples, motion around an ROI of the images may be visible in the cross-sectional image and may be used by the operator to decide whether the assisted mode is desirable. For example, a manually-activated request for switching to the assisted mode, such as a selectable button, may be included at the display screen 1000.

With the time period indicated by the bracket 906 of FIG. 9, the operator may monitor the difference image, which is refreshed as each new cross-sectional image is acquired and used to generate the difference image. In one example, when distortions are present in the difference image, the distortions may be readily observed by the operator and may additionally trigger display of a notification regarding movement detected outside of the ROI of the images. The display of the notification may be output by image processing software. Further, an option to switch to the assisted mode of scan acquisition initiation may be presented.

The operator may monitor the difference image and initiate scan acquisition based on visual observation when the operator selects the assisted mode. For example, scan acquisition may be manually triggered when the operator observes that the distortions are no longer present in the difference image. If the distortions persist through the time period indicated by bracket 906 of FIG. 9, the operator may be able to abort scan acquisition or may allow scan acquisition to begin when the data points 902 in the graph 900 reach the threshold contrast 904.

Alternatively, a machine learning model may be used from a start of acquisition of the cross-sectional image to monitor the difference image for the distortions. If the distortions are detected, indicating motion outside of the ROI, the machine learning model may automatically override automatic scan acquisition initiation to control triggering of scan acquisition. Scan acquisition may be triggered by the machine learning model when motion is no longer detected in the difference image. The machine learning model may also include instructions to monitor the contrast according to the data points 902 of graph 900. When the time period elapses as indicated in bracket 906 of FIG. 9 and motion still detected outside of the ROI, the operator may be presented with options to abort scan acquisition or proceed with scan acquisition, for example. The graph 900 may be displayed until the contrast reaches the threshold contrast 904 or until no motion is detected in the difference image and scan acquisition is initiated. Similarly, the difference image may be removed from the display screen 1000 when scan acquisition begins.

In this way, use of automated scan acquisition initiation in a CT system may be more robust to motion occurring outside of an ROI that may otherwise lead to erroneous triggering of scan acquisition. By implementing an assisted mode that may be used to override an automated mode when motion is detected, scan acquisition may be triggered at an operator's discretion or according to analysis by a machine learning model. The motion may be identified from a difference image generated by subtracting a mask image from a contrast image that is continuously acquired and refreshed until a change in contrast in the images reaches a threshold. By configuring the assisted mode (e.g., by the machine learning model or the operator) as an option to support the automated mode, use of the automated mode may be more appealing to an operator. Overall a work flow and efficiency may be increased while exposure of a subject to x-ray radiation may be reduced.

An example of a method 1100 for acquiring diagnostic CT scans is depicted in FIGS. 11A-11B. Instructions for carrying out method 1100 may be executed by a processor of a computing device, such as the computing device 216 of FIG. 2, based on instructions stored on a memory of the controller. In one example, the CT system may be the CT system 100 or the imaging system 200 of FIG. 2 The instructions may include a fast image alignment algorithm, and/or algorithms for a machine learning model trained to analyze images acquired and generated by the CT system. The CT system may be configured to operate in an automated mode, where contrast in a difference image may be automatically monitored for contrast, a manual mode, where collection of images and scans is controlled by an operator, and an assisted mode, which may be executed in conjunction with the automated mode.

Prior to execution of method 1100, or at a start of method 1100, a contrast agent may be delivered to a subject to be scanned. For example, the contrast agent may be injected into or ingested by the subject. An estimated duration of time for the contrast agent to be circulated through the subject to reach a target region of the subject may be predetermined and used as a time frame basis for execution of method 1100. For example, method 1100 may be executed within the duration of time between delivery of the contrast agent to the subject and circulation of the contrast agent to the target region such that enhanced contrast may be observed. As such, specific elements, such as a difference image and a graph, as described further below, may only be generated and displayed before the contrast agent reaches an ROI.

Turning first to FIG. 11A, at 1102, method 1100 includes confirming if the automated mode of operation is selected by the operator. If the automated mode is not selected, method 1100 continues to 1104 to operate in the manual mode. In the manual mode, the operator may observe cross-sectional images acquired by the CT system and displayed at a display device, such as the display device 232 of FIG. 2. The operator may initiate acquisition of diagnostic scans manually when motion between the time frames is evident based on observation of the difference images.

If the automated mode is selected, e.g., by the operator, method 1100 continues to 1106 to acquire a scout image. For example, the scout image may be the scout image 300 of FIG. 3, used to orient the CT system relative to the subject and to indicate where cross-sectional images are to be obtained from. After the scout image is acquired, a mask image is acquired at 1108. The mask image may be a first cross-sectional image obtained at a region indicated in the scout image with the CT system gantry stationary.

At 1110, method 1100 includes confirming if an ROI is indicated. For example, the ROI may be indicated by the operator selecting or placing a marker on the mask image. If the ROI is not indicated, method 1100 is held at 1110 until the ROI is indicated. If the ROI is indicated by the operator, method 1100 proceeds to 1112 to collect a contrast image and generate a difference image based on the contrast image and the mask image. The contrast image and the difference image may be displayed to the operator along with a graph plotting contrast at the ROI of the difference image with time, such as the graph 900 of FIGS. 9 and 10. The difference image may be generated by subtracting the mask image, on a pixel-by-pixel basis, from the contrast image, resulting in an image such as the examples of difference images depicted in FIGS. 6-7.

At 1114, method 1100 includes confirming if motion is detected in the difference image, outside of the ROI. For example, motion at the subject may be indicated by a presence of distortions, such as the distortions 702 of FIG. 7, in the difference image. The distortions may be identified by the operator, based on visual observation, or by the machine learning model. If motion is not detected, method 1100 continues to 1116 to confirm if the contrast at the ROI in the difference image reaches a threshold contrast. The threshold contrast may correspond to an expected change in contrast when the contrast agent reaches the ROI.

If the contrast does not reach the threshold, method 1100 returns to 1112 to collect another contrast image and generate a corresponding difference image. The newly acquired contrast image and corresponding difference image may replace the previous contrast image and difference image, thereby refreshing a display at the display device. The graph may also be updated to include a new data point corresponding to the contrast at the newly generated difference image. If the contrast meets the threshold at 1116, method 1100 proceeds to 1128 (as shown in FIG. 11B) to remove the difference image and the graph from the display, as described below.

Returning to 1114, if motion is detected in the difference image, method 1100 continues to 1118 to display a notification or alert to the operator that the motion is present. Displaying the notification or alert may also include displaying an option to or prompting the operator to switch to the assisted mode of operation. At 1120, method 1100 includes confirming if the assisted mode is requested. If, at 1120, a request for the assisted mode is not confirmed, method 1100 proceeds to 1116, as described above, to confirm if the contrast at the difference image reaches the threshold. If the request for the assisted mode is confirmed at 1120, method 1100 proceeds to 1122 to continue acquiring the contrast image, generating the difference image, and refreshing the display of the images and the graph.

In one example, refreshing the display of the contrast image may include re-positioning the ROI on a frame-to-frame basis to compensate for movement of the subject. The ROI may be re-positioned using the fast image alignment algorithm, as one example. In another example, the mask image may be registered prior to placement of the ROI and the contrast image may be registered to the mask image instead of re-positioning the ROI. In yet other examples, the ROI may be re-positioned by the machine learning model based on a vector map generated by the machine learning model to predict shifting of the ROI. For example, the vector map may be generated from the difference image, e.g., by analyzing the distortions. In some instances, using the machine learning model to update the position of the ROI in the displayed contrast image may be faster and less computing-intensive than image registration.

Turning now to FIG. 11B, at 1124, method 1100 includes confirming if the contrast of the ROI at the difference image reaches the threshold, as described above at 1116. If the contrast does not reach the threshold, method 1100 proceeds to 1126 to confirm if a request to initiate diagnostic scanning is received. If the request is not received, method 1100 returns to 1124 to again confirm if the contrast reaches the threshold. If, at 1126, the request to initiate diagnostic scanning is received, method 1100 proceeds to 1128 to cease displaying the difference image and the graph. In other words, the difference image may no longer be generated and both the difference image and the graph may be removed from the display at the display device. An option to switch to the assisted mode is no longer available, if not already selected. Method 1100 then proceeds to 1130 to begin acquiring diagnostic scans of the ROI. The request to initiate scan acquisition may be received from the operator when the operator observes that distortions are no longer present in the difference image. Alternatively, the request may be received from the machine learning model when the machine learning model determines that motion is no longer present based on analysis of the difference image.

Returning to 1124, if the contrast at the ROI of the difference image reaches the threshold, method 1100 continues to 1132 to confirm if a request to abort scan acquisition is received. For example, the operator may request that scan acquisition be aborted if the motion does not cease and/or the motion is to an extent where an ability to obtain useful information from diagnostic scans is compromised. Similarly, the request to abort scan acquisition may be received from the machine learning model if the machine learning model determines the motion is too great to be able to track the ROI reliably and the resulting scans are likely to be unusable. If the request to abort is received at 1132, the scan acquisition event is terminated at 1134. If the request to abort is not received, method 1100 continues to 1128 to remove the difference image and the graph from the display at the display screen. Method 1100 proceeds to 1130 to initiate acquisition of diagnostic scans.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for a method for an x-ray imaging system, comprising: responsive to operation of the x-ray imaging system in an automated mode, generating a difference image from a first image and a second image, and displaying the difference image at a display device to allow motion outside of a region of interest (ROI) to be detected based on analysis of the difference image, wherein the difference image is displayed before a contrast agent reaches the ROI. In a first example of the method, the difference image is displayed after the second image is acquired and continually refreshed at the display device as new images are acquired. In a second example of the method, optionally including the first example, the difference image is no longer displayed when the contrast agent reaches the ROI. In a third example of the method, optionally including one or both of the first and second examples, the first image is a mask image and the second image is a contrast image and both the first image and the second image are displayed at the display device, and wherein the difference image is generated by subtracting the first image from the second image. In a fourth example of the method, optionally including one or more or each of the first through third examples, the motion outside of the ROI is detected by a presence of distortions around the ROI in the difference image. In a fifth example of the method, optionally including one or more or each of the first through fourth examples, the method further comprises: continually acquiring new images and a display of an actual images with the new images, and wherein a new difference image is generated with each of the new images and displayed at the display device. In a sixth example of the method, optionally including one or more or each of the first through fifth examples, the method further comprises: presenting a notification at the display device when the motion is detected outside of the ROI, and wherein the notification includes an option to switch operation of the x-ray imaging system to an assisted mode. In a seventh example of the method, optionally including one or more or each of the first through sixth examples, when the x-ray imaging system operates in the assisted mode, scan acquisition is initiated based on input from an operator based on visual observation of motion by the operator. In a eighth example of the method, optionally including one or more or each of the first through seventh examples, the motion is detected using a machine learning model trained to identify motion in the difference image or by an operator by visually observing the difference image. In a ninth example of the method, optionally including one or more or each of the first through eighth examples, a graph plotting a contrast at the ROI in the difference image relative to time is also displayed at the display device, and wherein each data point of the graph corresponds to an acquisition of a new contrast image and corresponding generation of a new difference image.

The disclosure also provides support for an x-ray imaging system, comprising: an x-ray source and an x-ray detector arranged on opposite sides of a gantry, a subject positioned in the gantry, between the x-ray source and the x-ray detector, and a processor of a computing device configured with executable instructions, that, when executed, cause the processor to: generate a difference image by subtracting a mask image from a contrast image when operating in an automated mode, display the difference image at a display device, display a notification when motion outside of an ROI is detected at the difference image, and acquire diagnostic scans in response to receiving a request to initiate diagnostic scan acquisition, wherein the request to initiate diagnostic scan acquisition is received when the motion outside of the ROI is no longer detected at the difference image. In a first example of the system, the mask image is a first cross-sectional image acquired by the x-ray imaging system and the contrast image is a cross-sectional image acquired after the mask image, and wherein the contrast image is acquired at a predetermined frequency and displayed at the display device with the difference image. In a second example of the system, optionally including the first example, display of the difference image and the contrast image is refreshed according to the predetermined frequency until a contrast at the ROI in the difference image reaches a threshold contrast, the threshold contrast indicative of a contrast agent reaching the ROI. In a third example of the system, optionally including one or both of the first and second examples, the motion is automatically detected in the difference image by a machine learning model trained to detect the motion in the difference image based on a presence of distortions. In a fourth example of the system, optionally including one or more or each of the first through third examples, the machine learning model is further trained to determine a new position of the ROI based on the difference image and re-position the ROI in the contrast image when display of the contrast image at the display device is refreshed.

The disclosure also provides support for a method for operating an x-ray imaging system, comprising: generating a difference image from a mask image and a contrast image in response to operation of the x-ray imaging system in an automated scan acquisition initiation mode and displaying the difference image and the contrast image at a display device, providing an option to switch the operation of the x-ray imaging system to an assisted scan acquisition initiation mode when motion is detected in the difference image outside of a region of interest (ROI), upon receiving confirmation to switch the operation to the assisted scan acquisition initiation mode, continually refreshing display of the difference image and the contrast image, wherein refreshing the display includes re-positioning the ROI to compensate for the motion, and initiating diagnostic scan acquisition in response to receiving a request to initiate the diagnostic scan acquisition. In a first example of the method, the method further comprises: aborting the diagnostic scan acquisition when a request to abort is received from an operator or from a machine learning model. In a second example of the method, optionally including the first example, re-positioning of the ROI includes updating the contrast image with a new position of the ROI frame-to-frame using a fast image alignment algorithm. In a third example of the method, optionally including one or both of the first and second examples, a position of the ROI is tracked in the contrast image based on image registration, and wherein the image registration is conducted before the ROI is indicated in the contrast image. In a fourth example of the method, optionally including one or more or each of the first through third examples, re-positioning the ROI includes updating a position of the ROI in the contrast image frame-to-frame by a machine learning model, and wherein the machine learning model is configured to generate a vector map based on the difference image to determine the position of the ROI.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an x-ray imaging system, comprising: responsive to operation of the x-ray imaging system in an automated mode,
    generating a difference image from a first image and a second image; and
    displaying the difference image at a display device to allow motion outside of a region of interest (ROI) to be detected based on analysis of the difference image, wherein the difference image is displayed before a contrast agent reaches the ROI, wherein the first image is a mask image and the second image is a contrast image and both the first image and the second image are displayed at the display device, and wherein the difference image is generated by subtracting the first image from the second image.

2. The method of claim 1, wherein the difference image is displayed after the second image is acquired and continually refreshed at the display device as new images are acquired.

3. The method of claim 1, wherein the difference image is no longer displayed when the contrast agent reaches the ROI.

4. The method of claim 1, wherein the motion outside of the ROI is detected by a presence of distortions around the ROI in the difference image.

5. The method of claim 1, further comprising continually acquiring new images and a display of an actual images with the new images, and wherein a new difference image is generated with each of the new images and displayed at the display device.

6. The method of claim 1, further comprising presenting a notification at the display device when the motion is detected outside of the ROI, and wherein the notification includes an option to switch operation of the x-ray imaging system to an assisted mode.

7. The method of claim 6, wherein when the x-ray imaging system operates in the assisted mode, scan acquisition is initiated based on input from an operator based on visual observation of motion by the operator.

8. The method of claim 1, wherein the motion is detected using a machine learning model trained to identify motion in the difference image or by an operator by visually observing the difference image.

9. The method of claim 1, wherein a graph plotting a contrast at the ROI in the difference image relative to time is also displayed at the display device, and wherein each data point of the graph corresponds to an acquisition of a new contrast image and corresponding generation of a new difference image.

10. An x-ray imaging system, comprising:
    an x-ray source and an x-ray detector arranged on opposite sides of a gantry;
    a subject positioned in the gantry, between the x-ray source and the x-ray detector; and
    a processor of a computing device configured with executable instructions, that, when executed, cause the processor to:
        generate a difference image by subtracting a mask image from a contrast image when operating in an automated mode;
        display the difference image, the mask image, and the contrast image at a display device;
        display a notification when motion outside of an ROI is detected at the difference image; and
        acquire diagnostic scans in response to receiving a request to initiate diagnostic scan acquisition, wherein the request to initiate diagnostic scan acquisition is received when the motion outside of the ROI is no longer detected at the difference image.

11. The x-ray imaging system of claim 10, wherein the mask image is a first cross-sectional image acquired by the x-ray imaging system and the contrast image is a cross-sectional image acquired after the mask image, and wherein the contrast image is acquired at a predetermined frequency.

12. The x-ray imaging system of claim 11, wherein display of the difference image and the contrast image is refreshed according to the predetermined frequency until a contrast at the ROI in the difference image reaches a threshold contrast, the threshold contrast indicative of a contrast agent reaching the ROI.

13. The x-ray imaging system of claim 10, wherein the motion is automatically detected in the difference image by a machine learning model trained to detect the motion in the difference image based on a presence of distortions.

14. The x-ray imaging system of claim 13, wherein the machine learning model is further trained to determine a new position of the ROI based on the difference image and re-position the ROI in the contrast image when display of the contrast image at the display device is refreshed.

15. A method for operating an x-ray imaging system, comprising:
generating a difference image from a mask image and a contrast image in response to operation of the x-ray imaging system in an automated scan acquisition initiation mode and displaying the difference image and the contrast image at a display device, wherein the display device further displays a real-time graph, a cross-sectional image, and a second difference image;
providing an option to switch the operation of the x-ray imaging system to an assisted scan acquisition initiation mode when motion is detected in the difference image outside of a region of interest (ROI);
upon receiving confirmation to switch the operation to the assisted scan acquisition initiation mode, continually refreshing display of the difference image and the contrast image, wherein refreshing the display includes re-positioning the ROI to compensate for the motion; and
initiating diagnostic scan acquisition in response to receiving a request to initiate the diagnostic scan acquisition.

16. The method of claim 15, further comprising aborting the diagnostic scan acquisition when a request to abort is received from an operator or from a machine learning model.

17. The method of claim 15, wherein re-positioning of the ROI includes updating the contrast image with a new position of the ROI frame-to-frame using a fast image alignment algorithm.

18. The method of claim 15, wherein a position of the ROI is tracked in the contrast image based on image registration, and wherein the image registration is conducted before the ROI is indicated in the contrast image.

19. The method of claim 15, wherein re-positioning the ROI includes updating a position of the ROI in the contrast image frame-to-frame by a machine learning model, and wherein the machine learning model is configured to generate a vector map based on the difference image to determine the position of the ROI.

* * * * *